United States Patent
Lai

(10) Patent No.: US 7,066,445 B1
(45) Date of Patent: Jun. 27, 2006

(54) CONTROL VALVE HAVING CLOSELY SEALING EFFECT

(76) Inventor: Hung-Lin Lai, 5-3, Chien Pan Lane, Lu Kang Township, Kou Chien Li, Changhua Hsien (TW)

( * ) Notice: Subject to any disclaimer, the term of this patent is extended or adjusted under 35 U.S.C. 154(b) by 43 days.

(21) Appl. No.: 10/909,893

(22) Filed: Aug. 2, 2004

(51) Int. Cl.
*F16K 5/00* (2006.01)

(52) U.S. Cl. ..................... 251/309; 251/312

(58) Field of Classification Search ............. 251/309
See application file for complete search history.

(56) References Cited

U.S. PATENT DOCUMENTS

| 2,244,237 | A | * | 6/1941 | Belknap | 237/63 |
| 2,497,448 | A | * | 2/1950 | Grosboll | 251/175 |
| 3,133,723 | A | * | 5/1964 | Goldman et al. | 251/309 |
| 3,343,802 | A | * | 9/1967 | Schuilwerve | 251/175 |

\* cited by examiner

*Primary Examiner*—J. Casimer Jacyna
(74) *Attorney, Agent, or Firm*—Alan D. Kamrath; Nikolai & Mersereau, P.A.

(57) ABSTRACT

A control valve includes a valve seat, a control switch, and at least one leakproof ring. Thus, when the control valve is disposed at a closed state, the water inlet or the water outlet of the valve seat is stopped by the leakproof groove of the control switch and is sealed closely by the leakproof ring, thereby enhancing the leakproof effect of the control valve.

1 Claim, 6 Drawing Sheets

US 7,066,445 B1

CONTROL VALVE HAVING CLOSELY SEALING EFFECT

BACKGROUND OF THE INVENTION

1. Field of the Invention

The present invention relates to a control valve mounted between water pipes to control a water flow between the water pipes, and more particularly to a control valve having a closely sealing effect.

2. Description of the Related Art

A conventional control valve in accordance with the prior art shown in FIGS. 7–9 comprises a valve seat 10 having an inside formed with a flow channel 11 and a peripheral wall formed with a valve hole 12 communicating with the flow channel 11, and a control member 20 rotatably mounted in the valve hole 12 of the valve seat 10 and having an inside formed with a water channel 21. The control member 20 has a peripheral wall formed with a plurality annular grooves 22 for mounting O-rings 25 and a snap groove 23 for mounting a snap ring 26. The control member 20 has an end face formed with a switch portion 24.

When the control member 20 is rotated to the position as shown in FIG. 8, the water channel 21 of the control member 20 aligns with the flow channel 11 of the valve seat 10, so that the conventional control valve is disposed at an opened state. When the control member 20 is rotated to the position as shown in FIG. 9, the flow channel 11 of the valve seat 10 is not connected to the water channel 21 of the control member 20 and is closed by the peripheral wall of the control member 20, so that the conventional control valve is disposed at a closed state.

However, the peripheral wall of the control member 20 does not seal the flow channel 11 of the valve seat 10 closely, so that the water from the flow channel 11 of the valve seat 10 easily passes through the peripheral wall of the control member 20 as shown in FIG. 9, thereby decreasing the sealing effect of the conventional control valve.

SUMMARY OF THE INVENTION

In accordance with one embodiment of the present invention, there is provided a control valve, comprising:
a valve seat having an inside formed with a valve chamber having a first side formed with a water inlet and a second side formed with a water outlet;
a control switch rotatably mounted in the valve chamber of the valve seat and having an inside formed with a water channel; and
two leakproof rings each mounted on the control switch to move therewith, wherein:
the control switch is rotatable between a first position where the water channel of the control switch aligns with the water inlet and the water outlet of the valve seat to connect the water inlet and the water outlet of the valve seat, and a second position where each of the water inlet and the water outlet of the valve seat is closed by a peripheral wall of the control switch and is sealed closely by a respective one of the two leakproof rings.

In accordance with another embodiment of the present invention, there is provided a control valve, comprising:
a valve seat having an inside formed with a valve chamber having a first side formed with a water inlet and a second side formed with a water outlet;
a control switch rotatably mounted in the valve chamber of the valve seat and having an inside formed with a water chamber communicating with the water inlet of the valve seat and a peripheral wall formed with a water channel communicating with the water chamber; and
a leakproof ring mounted on the control switch to move therewith, wherein:
the control switch is rotatable between a first position where the water channel of the control switch aligns with the water outlet of the valve seat to connect the water inlet and the water outlet of the valve seat, and a second position where the water outlet of the valve seat is closed by a peripheral wall of the control switch and is sealed closely by the leakproof ring.

The primary objective of the present invention is to provide a control valve having a closely sealing effect.

Another objective of the present invention is to provide a control valve, wherein when the control valve is disposed at a closed state, each of the water inlet and the water outlet of the valve seat is stopped by a respective one of the leakproof grooves of the control switch and is sealed closely by a respective one of the leakproof rings, thereby enhancing the leakproof effect of the control valve.

Further benefits and advantages of the present invention will become apparent after a careful reading of the detailed description with appropriate reference to the accompanying drawings.

DETAILED DESCRIPTION OF THE INVENTION

Figure 1:
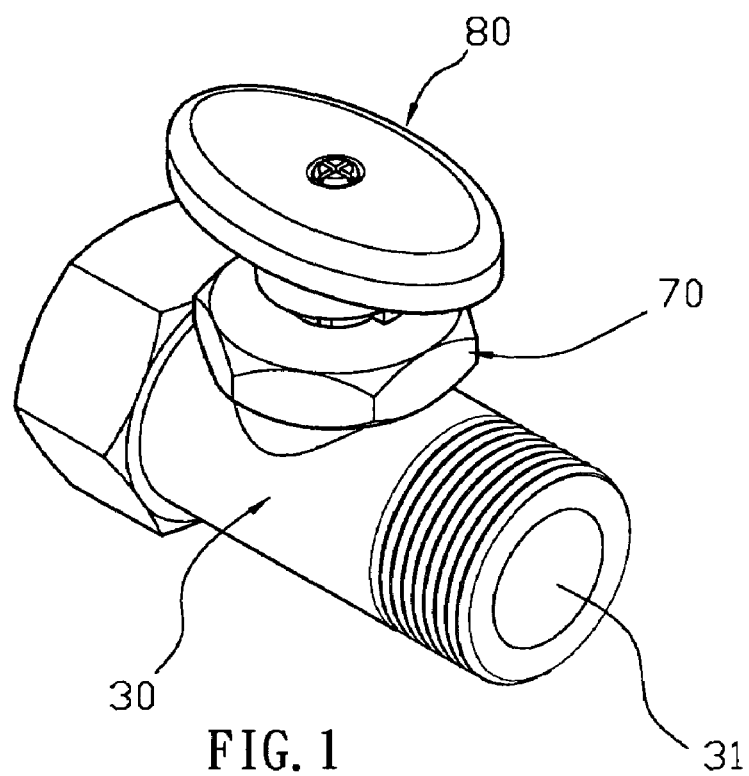
FIG. 1 is a perspective view of a control valve in accordance with the preferred embodiment of the present invention.
Figure 3:
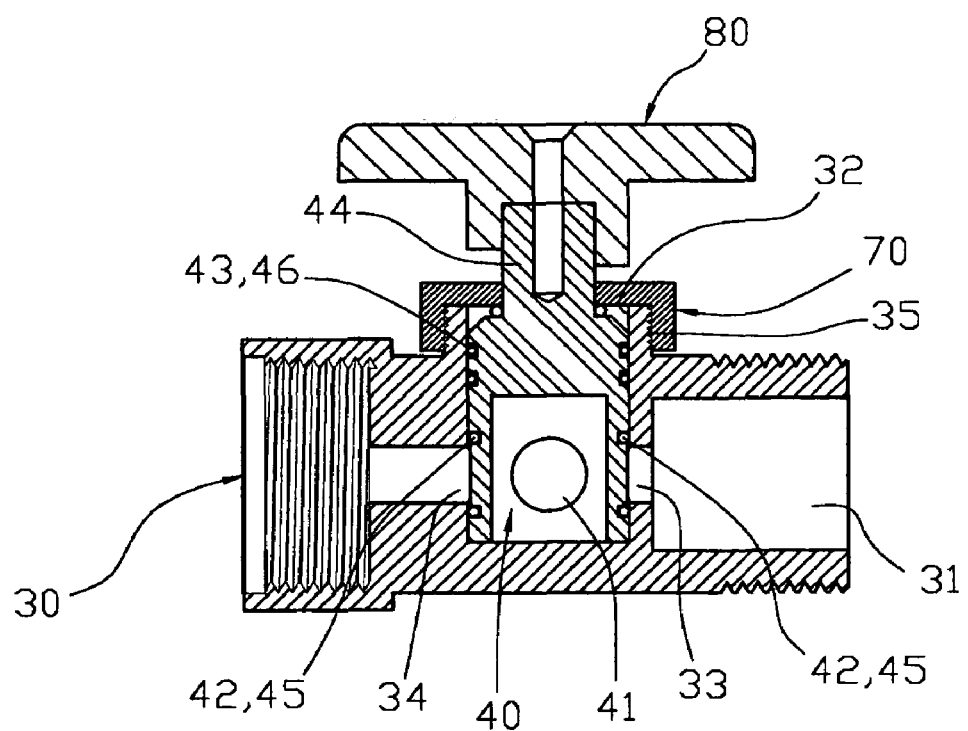
FIG. 3 is a plan cross-sectional view of the control valve as shown in FIG. 1.
Figure 2:
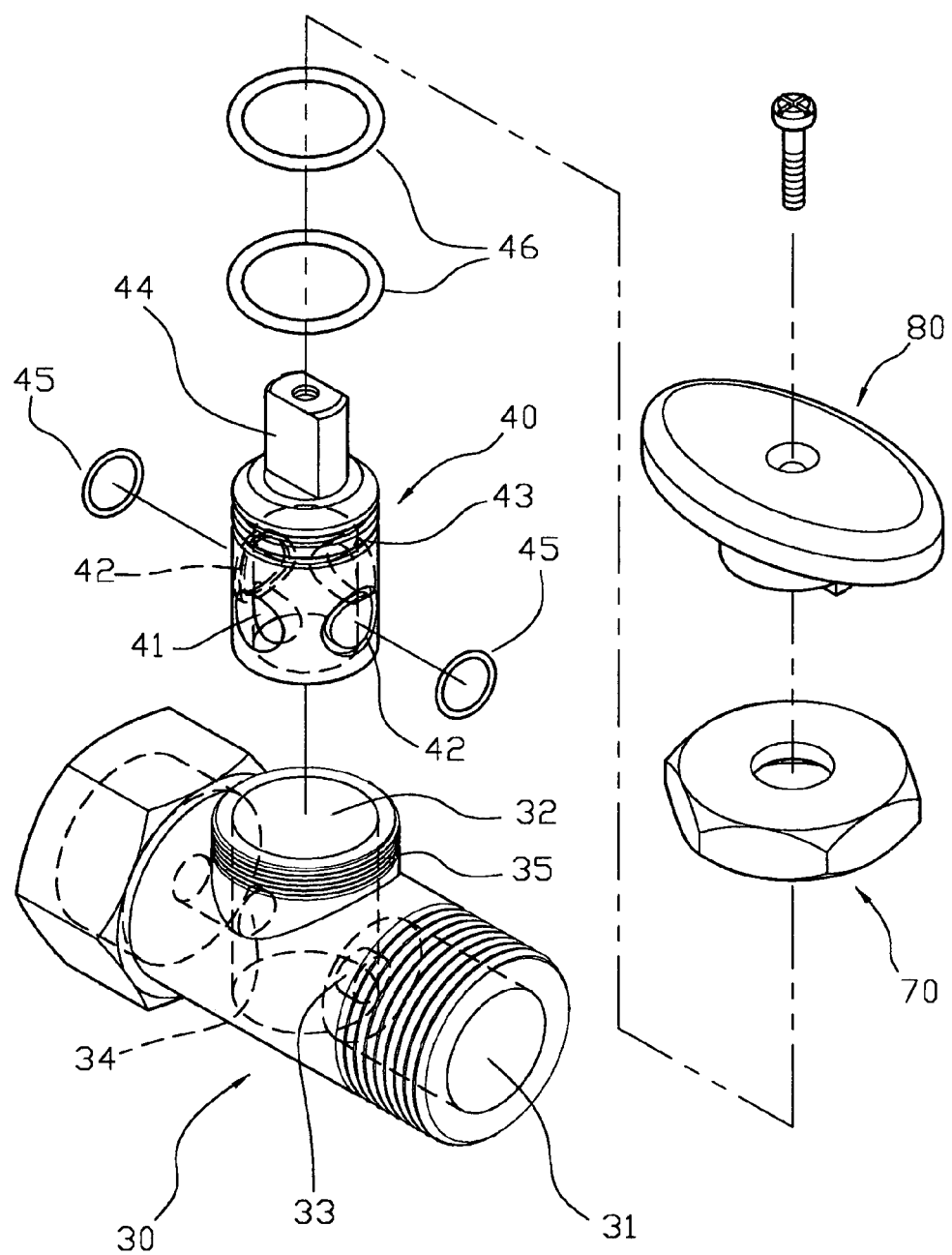
FIG. 2 is an exploded perspective view of the control valve as shown in FIG. 1.

Referring to the drawings and initially to FIGS. 1–3, a linear type control valve in accordance with the preferred embodiment of the present invention comprises a valve seat 30 having an inside formed with a valve chamber 32 having a first side formed with a water inlet 33 and a second side formed with a water outlet 34, a control switch 40 rotatably mounted in the valve chamber 32 of the valve seat 30 and having an inside formed with a water channel 41, and two leakproof rings 45 each mounted on the control switch 40 to move therewith.

Thus, the control switch 40 is rotatable between a first position where the water channel 41 of the control switch 40 aligns with the water inlet 33 and the water outlet 34 of the valve seat 30 to connect the water inlet 33 and the water outlet 34 of the valve seat 30, and a second position (see FIG. 3) where each of the water inlet 33 and the water outlet 34 of the valve seat 30 is closed by a peripheral wall of the control switch 40 to interrupt a connection between the water inlet 33 and the water outlet 34 of the valve seat 30 exactly and is sealed closely by a respective one of the two leakproof rings 45 to provide an efficient leakproof effect.

The inside of the valve seat 30 is formed with a flow channel 31 communicating with the water inlet 33 and the water outlet 34. The valve seat 30 has a peripheral wall formed with a threaded mounting portion 35.

The peripheral wall of the control switch 40 is formed with two radially opposite annular leakproof grooves 42 for mounting the leakproof rings 45. Preferably, the leakproof grooves 42 of the control switch 40 are not communicated with the water channel 41. Preferably, the leakproof grooves 42 of the control switch 40 are perpendicular to the water channel 41. The control switch 40 has an end formed with two annular groove 43 for mounting two O-rings 46 urged on a wall of the valve chamber 32 of the valve seat 30. The control switch 40 has an end face formed with a control lever 44 protruding outward from the valve seat 30.

A locking nut 70 is mounted on the control switch 40 and screwed onto the threaded mounting portion 35 of the valve seat 30 to limit the control switch 40 on the valve seat 30. A control handle 80 is secured on the control lever 44 of the control switch 40 to control rotation of the control switch 40.

In operation, when the control handle 80 is rotated, the control switch 40 is rotated to the first position where the water channel 41 of the control switch 40 aligns with the water inlet 33 and the water outlet 34 of the valve seat 30 to connect the water inlet 33 and the water outlet 34 of the valve seat 30, so that the control valve is disposed at an opened state, thereby allowing the water to flow through the flow channel 31, the water inlet 33 and the water outlet 34 of the valve seat 30.

Alternatively, the control switch 40 is rotated to the second position as shown in FIG. 3 where each of the water inlet 33 and the water outlet 34 of the valve seat 30 is closed by the peripheral wall of the control switch 40 to interrupt the connection between the water inlet 33 and the water outlet 34 of the valve seat 30, so that the control valve is disposed at a closed state, thereby stopping the water flowing through the flow channel 31, the water inlet 33 and the water outlet 34 of the valve seat 30.

At this time, each of the water inlet 33 and the water outlet 34 of the valve seat 30 is aligned with and stopped by a respective one of the leakproof grooves 42 of the control switch 40 and is sealed closely by a respective one of the leakproof rings 45, thereby enhancing the leakproof effect of the control valve.

Accordingly, when the control valve is disposed at a closed state, each of the water inlet 33 and the water outlet 34 of the valve seat 30 is stopped by a respective one of the leakproof grooves 42 of the control switch 40 and is sealed closely by a respective one of the leakproof rings 45, thereby enhancing the leakproof effect of the control valve.

Figure 4:
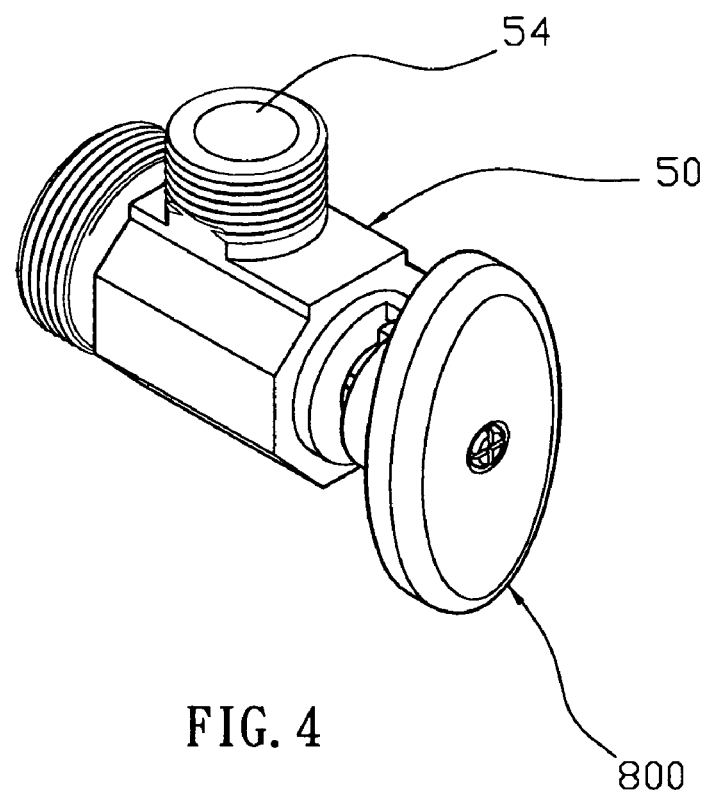
FIG. 4 is a perspective view of a control valve in accordance with another embodiment of the present invention.
Figure 6:
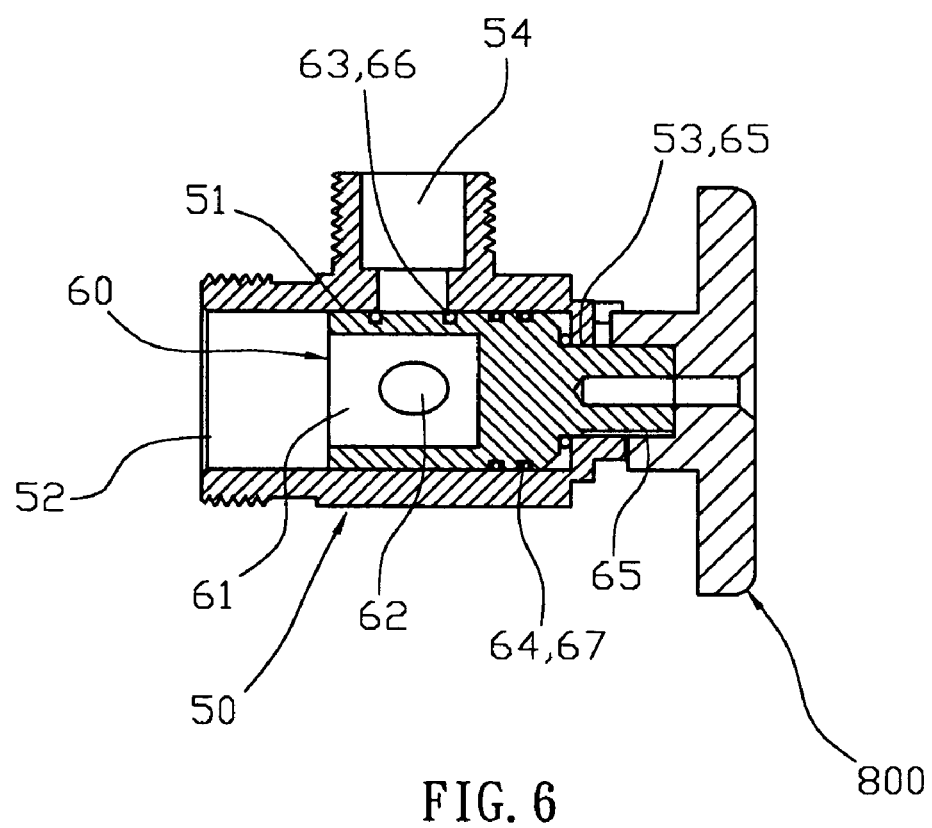
FIG. 6 is a plan cross-sectional view of the control valve as shown in FIG. 4.
Figure 5:
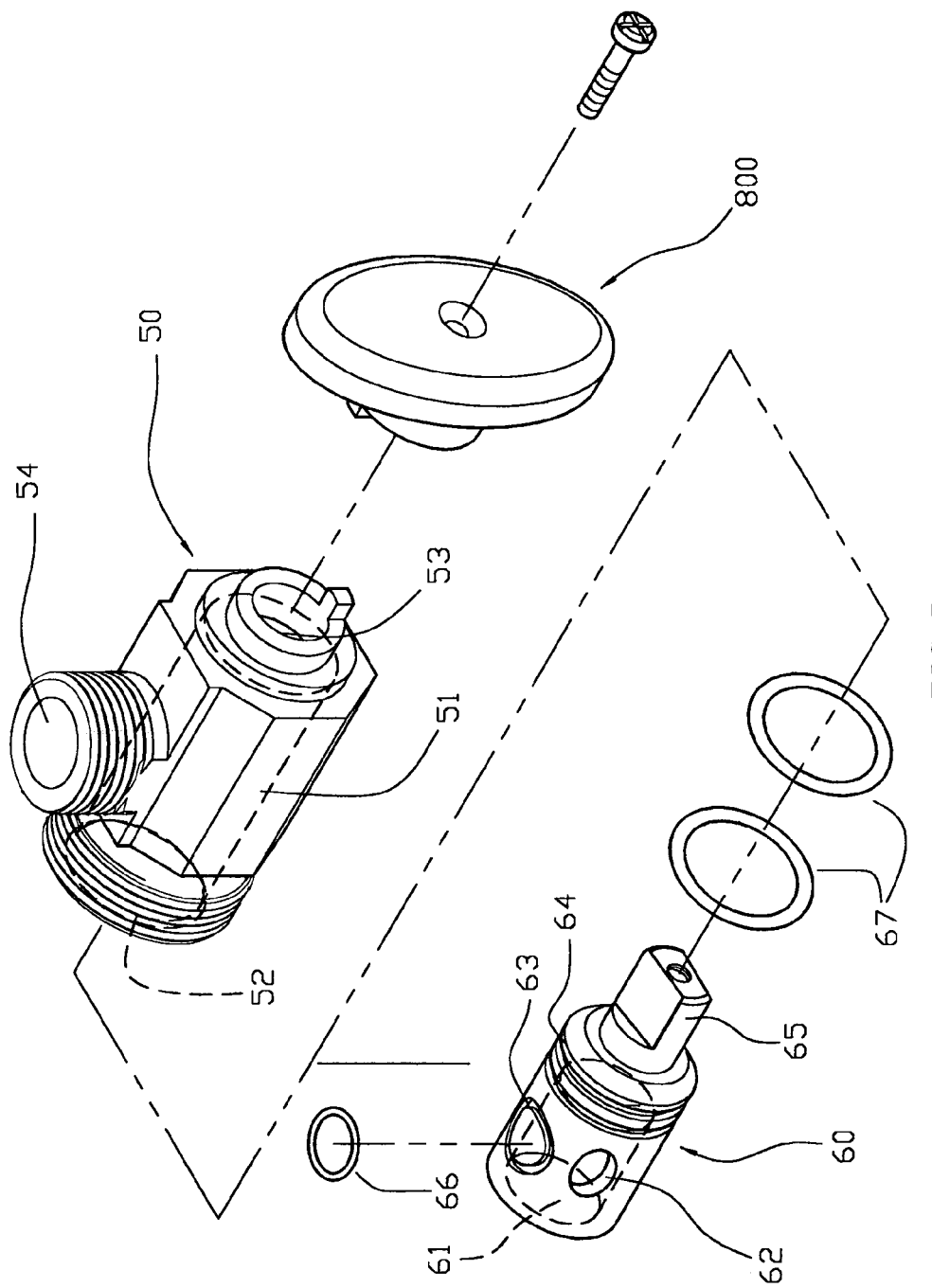
FIG. 5 is an exploded perspective view of the control valve as shown in FIG. 4.
Figure 7:
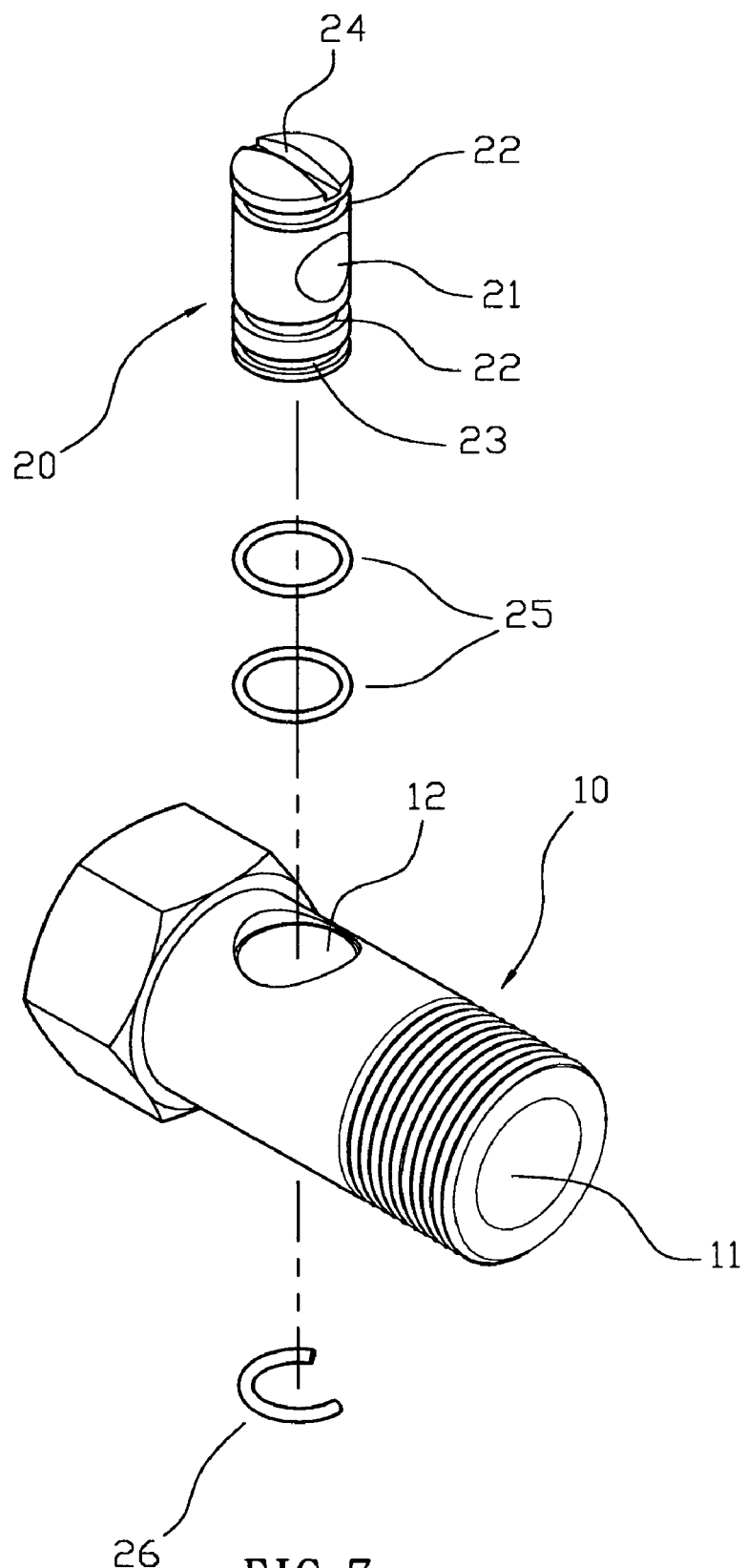
FIG. 7 is an exploded perspective view of a conventional control valve in accordance with the prior art.
Figure 8:
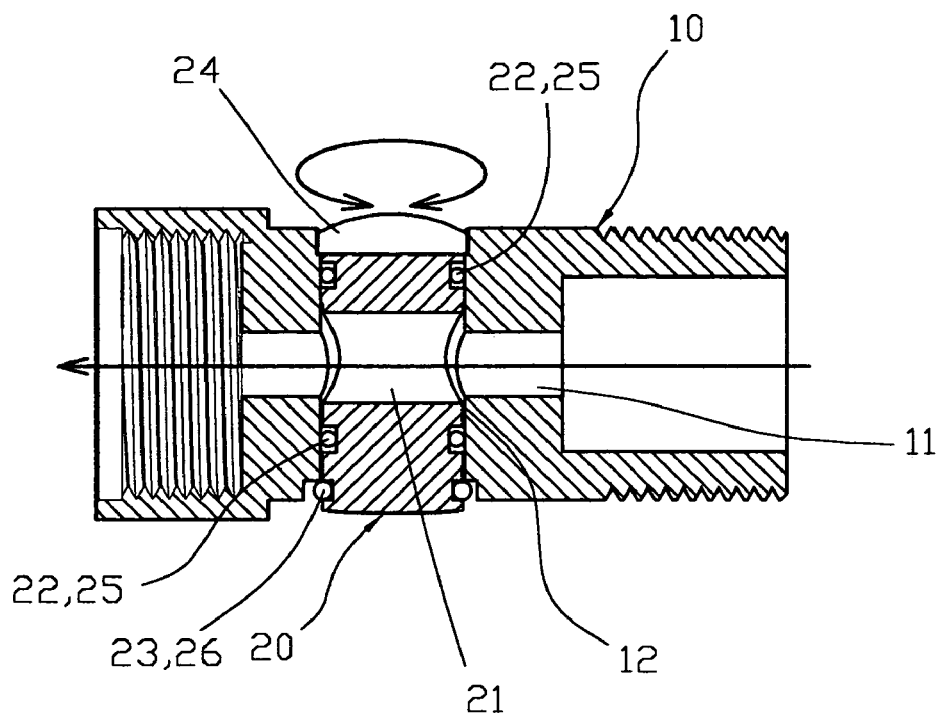
FIG. 8 is a plan cross-sectional assembly view of the conventional control valve as shown in FIG. 7.
Figure 9:
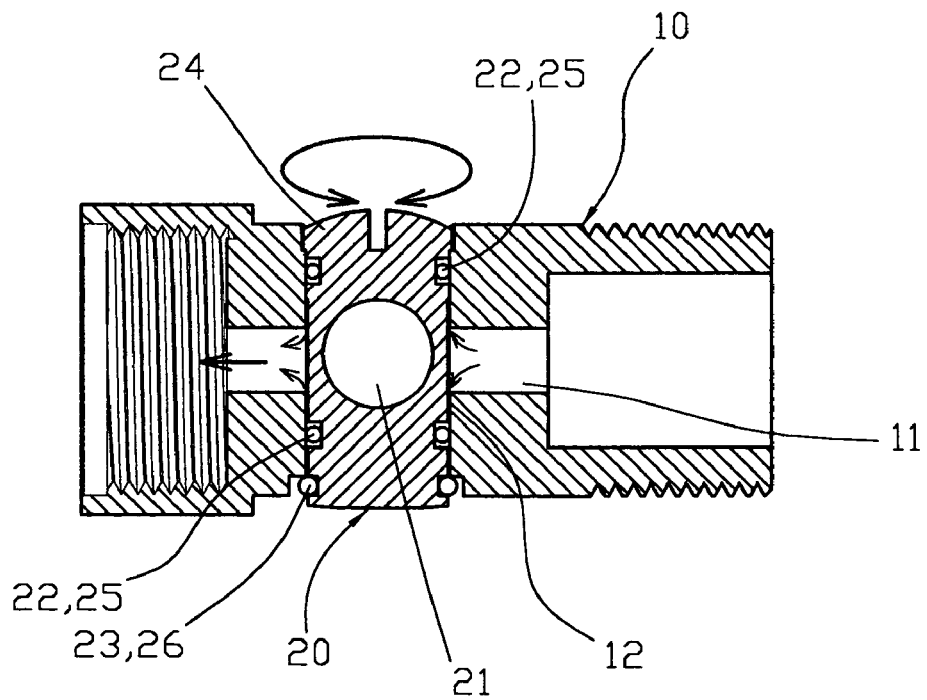
FIG. 9 is a schematic operational view of the conventional control valve as shown in FIG. 8.

Referring to FIGS. 4–6, an angular type control valve in accordance with the preferred embodiment of the present invention comprises a valve seat 50 having an inside formed with a valve chamber 51 having a first side formed with a water inlet 52 and a second side formed with a water outlet 54, a control switch 60 rotatably mounted in the valve chamber 51 of the valve seat 50 and having an inside formed with a water chamber 61 communicating with the water inlet 52 of the valve seat 50 and a peripheral wall formed with a water channel 62 communicating with the water chamber 61, and a leakproof ring 66 mounted on the control switch 60 to move therewith.

Thus, the control switch 60 is rotatable between a first position where the water channel 62 of the control switch 60 aligns with the water outlet 54 of the valve seat 50 to connect the water inlet 52 and the water outlet 54 of the valve seat 50, and a second position (see FIG. 6) where the water outlet 54 of the valve seat 50 is closed by a peripheral wall of the control switch 60 to interrupt a connection between the water inlet 52 and the water outlet 54 of the valve seat 50 exactly and is sealed closely by the leakproof ring 66 to provide an efficient leakproof effect.

The valve seat 50 has an end formed with a through hole 53. The peripheral wall of the control switch 60 is formed with an annular leakproof groove 63 for mounting the leakproof ring 66. Preferably, the leakproof groove 63 of the control switch 60 is not communicated with the water channel 62. The control switch 60 has an end formed with two annular groove 64 for mounting two O-rings 67 urged on a wall of the valve chamber 51 of the valve seat 50. The control switch 60 has an end face formed with a control lever 65 protruding outward from the through hole 53 of the valve seat 50. A control handle 800 is secured on the control lever 65 of the control switch 60 to control rotation of the control switch 60.

In operation, when the control handle 800 is rotated, the control switch 60 is rotated to the first position where the water channel 62 of the control switch 60 aligns with the water outlet 54 of the valve seat 50 to connect the water inlet 52 and the water outlet 54 of the valve seat 50, so that the control valve is disposed at an opened state, thereby allowing the water to flow through the water inlet 52 and the water outlet 54 of the valve seat 50.

Alternatively, the control switch 60 is rotated to the second position as shown in FIG. 6 where the water outlet 54 of the valve seat 50 is closed by a peripheral wall of the control switch 60 to interrupt a connection between the water inlet 52 and the water outlet 54 of the valve seat 50, so that the control valve is disposed at a closed state, thereby stopping the water flowing through the water inlet 52 and the water outlet 54 of the valve seat 50.

At this time, the water outlet 54 of the valve seat 50 is aligned with and stopped by the leakproof groove 63 of the control switch 60 and is sealed closely by the leakproof ring 66, thereby enhancing the leakproof effect of the control valve.

Accordingly, when the control valve is disposed at a closed state, the water outlet 54 of the valve seat 50 is stopped by the leakproof groove 63 of the control switch 60 and is sealed closely by the leakproof ring 66, thereby enhancing the leakproof effect of the control valve.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A control valve, comprising:
a valve seat having an inside formed with a valve chamber having a first side formed with a water inlet and a second side formed with a water outlet;
a control switch rotatably mounted in the valve chamber of the valve seat and having an inside formed with a water channel; and two annular leakproof rings each detachably mounted on the control switch to move therewith, wherein:

the control switch is rotatable between a first position where the water channel of the control switch aligns with the water inlet and the water outlet of the valve seat to connect the water inlet and the water outlet of the valve seat, and a second position where each of the water inlet and the water outlet of the valve seat is closed by a peripheral wall of the control switch and is sealed closely by a respective one of the two annular leakproof rings;

the peripheral wall of the control switch is formed with two radially opposite annular leakproof grooves for detachably mounting the annular leakproof rings;

the leakproof grooves of the control switch are not communicated with the water channel;

the leakproof grooves of the control switch are perpendicular to the water channel;

when the control switch is rotatable to the second position, each of the water inlet and the water outlet of the valve seat is aligned with and stopped by a respective one of the leakproof grooves of the control switch;

the valve seat has a peripheral wall formed with a threaded mounting portion, and the control valve further comprises a locking nut mounted on the control switch and screwed onto the threaded mounting portion of the valve seat to limit the control switch on the valve seat;

the control switch has an end face formed with a control lever extending through the locking nut and protruding outward from the valve seat, and the control valve further comprises a control handle secured on the control lever of the control switch to control rotation of the control switch.

\* \* \* \* \*